United States Patent [19]

Gazza et al.

[11] 4,029,755

[45] June 14, 1977

[54] TRANSPARENT ULTRAFINE GRAINED CERAMICS

[75] Inventors: George E. Gazza, Sudbury; Sunil K. Dutta, Waltham, both of Mass.

[73] Assignee: The United States of America as represented by the Secretary of the Army, Washington, D.C.

[22] Filed: Apr. 11, 1973

[21] Appl. No.: 350,287

Related U.S. Application Data

[60] Division of Ser. No. 224,244, Feb. 7, 1972, Pat. No. 3,767,745, which is a continuation-in-part of Ser. No. 81,612, Oct. 16, 1970, abandoned.

[52] U.S. Cl. .............................. 423/600; 423/263; 423/635; 423/622; 264/65; 264/66; 264/332
[51] Int. Cl.² .......................................... C01F 7/04
[58] Field of Search .................. 423/600; 23/302; 264/65

[56] References Cited

UNITED STATES PATENTS

| | | | |
|---|---|---|---|
| 2,474,440 | 6/1949 | Smith et al. | 423/600 X |
| 3,423,188 | 1/1969 | Lutwitzi et al. | 23/302 X |
| 3,766,080 | 10/1973 | Swinehart et al. | 23/302 X |

FOREIGN PATENTS OR APPLICATIONS 1,129,669  10/1968  United Kingdom ............... 423/600

*Primary Examiner*—Herbert T. Carter
*Attorney, Agent, or Firm*—Nathan Edelberg; Robert P. Gibson; Muzio B. Roberto

[57] ABSTRACT

A pressure sintering process for the fabrication of ultrafine grained ceramics having improved strength and enhanced transparency comprising the cold compressing of a ceramic oxide powder having a cubic crystal structure, removing undesired gases, raising to a temperature at which full density of the compact can be obtained in isothermal increments of about 50° under elevated pressures while maintaining the temperature at each incremental increase for a period of about 50–60 minutes, and recovering the product.

1 Claim, No Drawings

TRANSPARENT ULTRAFINE GRAINED CERAMICS

The invention herein may be manufactured, used, and licensed by or for the Government for governmental purposes without the payment to us of any royalty thereon.

This application is a division of assigned application Ser. No. 224,244, filed Feb. 7, 1972 (now U.S. Pat. No. 3,767,745, dated Oct. 23, 1973), which in turn is continuation-in-part of Ser. No. 81,612, filed Oct. 16, 1970, now abandoned.

This invention relates to a method for the fabrication of ultrafine grained ceramics having improved strength and transparency comprising the heating of a ceramic oxide having a cubic crystal structure in isothermal increments under elevated pressures.

It is an object of this invention to provide and disclose a vacuum hot pressing method for the fabrication of ultrafine grained ceramics having improved strength.

It is a further object of this invention to provide and disclose a vacuum hot pressed method for the fabrication of ultrafine grained ceramics having enhanced transparency without the utilization of additives as sintering aids or grain growth inhibitors.

Other objects and a fuller understanding of the invention may be had by referring to the following description and claims.

The present ultrafine grained ceramics were fabricated, as described below, utilizing a ceramic oxide powder having a cubic crystal structure, Example 1 described the preparation of a ceramic utilizing magnesium aluminate in accordance with the present method, i.e., incremental heating. In comparison with Example 1, the magnesium aluminate was heated directly to a temperature of 1500° C, as described in Examples 2 and 3. The desired product of Example 1 was not obtained. Example 4 describes the preparation of a ceramic utilizing lithium aluminate in accordance with the present method. In comparison with Example 4, the lithium aluminate was heated directly as described in Example 5. The desired product of Example 4 was not obtained.

EXAMPLE 1

In operation, commercially available (W. R. Grace) magnesium aluminate ($MgAl_2O_4$) having a purity of 99.90 to about 99.99%, and a particle size of about 1 micron is cold pressed into discs by any conventional means to about 40–50% of theoretical density. The cold pressed magnesium aluminate compact is loaded into a conventional vacuum hot press graphite die which has been lined with molybdenum. The die comprises a graphite top punch and a graphite bottom punch. A molybdenum spacer, which is 1" in diameter by 0.02" thickness, is positioned between the magnesium aluminate compact and the graphite top punch and the magnesium aluminate compact and the bottom punch in order to inhibit undesirable reactions between the magnesium aluminate and the graphite. The vacuum chamber is evacuated and the temperature gradually raised to around 600° C. The temperature is maintained at around 600° C for a period of approximately 1 hour in order to remove undesired gases. An indication that the "outgassing" is complete is when a steady vacuum of $10^{+5}$ torr can be maintained in the chamber. The temperature is then raised to about 1150° C and a pressure of 6000 psi is applied. A pressure range of 6,000–7,000 psi has been found operable. The temperature is held at 1,150° C for a period of about 60 minutes and then raised in 50° C increments until a temperature of around 1,500° C is reached. The temperature is maintained at each 50° increment for a period of about 60 minutes. A temperature range holding time of 50–60 minutes has been found operable. The ceramic material is maintained at a temperature of around 1,500° C for a period of 120 minutes. The die is then slowly cooled until a temperature of about 1,300° C is reached. The pressure is then released and the die is allowed to cool to room temperature.

A transparent magnesium aluminate spinel 1 inch in diameter and ⅛ inch in thickness having a grain size of approximately 1 micron was obtained. It has been established from known strength-grain size relationship with ceramic materials that ultrafine grain sizes are important for improved strength. In addition, an unusually high degree of transgranular fracture was observed from electron fractograph which indicated a potentially high fracture energy.

EXAMPLE 2

A cold compacted sample of magnesium aluminate was positioned in a conventional vacuum hot press graphite die and degassed as described in Example 1. A pressure of around 6000 psi was applied and the die was heated directly to 1,500° C. The die was maintained at a temperature of 1,500° C for a period of around 120 minutes. The die was slowly cooled until a temperature of about 1,300° C was reached. The pressure was then released and the die allowed to cool to room temperature and the product recovered. A nontransparent magnesium aluminate spinel disc was obtained. In addition the grain sizes of the product were larger than the grain sizes of the product of Example 1.

EXAMPLE 3

The process of Example 2 was repeated with the exception that a pressure of 6000 psi was applied after heating directly to 1,500° C. A nontransparent magnesium aluminate spinel disc was obtained. in addition, the grain sizes of the product was larger than the grain sizes of the product of Example 1.

EXAMPLE 4

The process of Example 1 was carried out utilizing lithium aluminate ($LiAl_5O_8$). The lithium aluminate was prepared by mixing 1.37 grams of $Li_2CO_3$ (0.019 moles) and 69.51 grams of $Al(NO_3)_3 \cdot 9H_2O$ (0.186 moles). Sufficient water was added to completely dissolve the salts. The resultant mixed aqueous salt solution was injected into liquid nitrogen to form frozen spheroids. The frozen spheroids were then immersed in a solution of ammonium hydroxide maintained at a temperature no higher than 5° C to precipitate the mixed-cation hydroxides. The precipitate was recovered by decantation and dried at low temperatures, e.g., with infrared lamps. The dry powder was calcined by heating in air at a temperature of less than 1000° C. A product having a particle size of about 1 micron was obtained.

The above prepared lithium aluminate was cold pressed into discs to about 40–50% of theoretical density. The discs subjected to the identical conditions set forth in Example 1, with the exception that the die was heated in isothermal increments to a temperature of 1,600° C instead of 1,500° C. A transparent ultrafine grained ceramic having a grained size of about 1 micron was recovered.

EXAMPLE 5

The process of Example 4 was repeated with the exception that after the removal of undesired gases from the ceramic material, a pressure of 6000 psi was applied and the die was heated directly to 1,600° C. A nontransparent ceramic material was obtained.

In addition to $MgAl_2O_4$ and $LiAl_5O$, it is contemplated that the present process can be utilized to promote ultrafine grains, high strength and transparency in other ceramic oxides having a cubic crystal e.g., $Y_3Al_5O_{12}$, MgO and ZnO. Of course, particular parameters such as temperature sintering range and time at specific incremental temperature may vary depending on the particular oxide system being utilized.

Possible applications of the ceramic material include high intensity lamps, infrared windows for heat seeking rockets, windows for high temperature application, and development of transparent armor for ground vehicles.

Although we have described our invention with a certain degree of particularity, we wish it to be understood that we do not desire to be limited to the exact details shown and described in that obvious modifications will occur to a person skilled in the art.

Having described our invention, we claim.

1. Light-transparent ultrafine grained lithium aluminate made by a method of cold-pressing a lithium aluminate powder having a cubic crystal structure and having the formula $LiAl_5O_8$, to form a compact, followed by pressing the compact; said method comprising the steps of:

cold-compressing said lithium aluminate powder to about 40–50% of theoretical density to form a compact, heating the compact under a vacuum to about 600° C to remove undesired gases, raising the temperature of said compact to about 1,150° C, applying a pressure of about 6000–7000 p.s.i., maintaining said compact at said temperature and pressure for about 50–60 minutes, further raising the temperature of said compact to about 1,600° C in isothermal increments of about 50° C under said pressure while maintaining the temperature at each incremental increase for a period of about 50–60 minutes, and recovering a full-density light-transparent product having a grain of about 1 micron.

* * * * *